United States Patent [19]

Heller

[11] 4,194,303
[45] Mar. 25, 1980

[54] ANTI-CHOKING MANIKIN

[75] Inventor: Robert D. Heller, Green Bay, Wis.

[73] Assignee: Medical Plastics Laboratory, Inc., Gatesville, Tex.

[21] Appl. No.: 912,099

[22] Filed: Jun. 2, 1978

[51] Int. Cl.² ............................................. G09B 23/30
[52] U.S. Cl. ............................................. 35/17; 46/44; 46/141
[58] Field of Search ................... 35/17, 62; 46/44, 141, 46/148; 124/55; 272/8 N, 27 B, 27 N

[56] References Cited
U.S. PATENT DOCUMENTS

| | | | |
|---|---|---|---|
| 1,143,458 | 6/1915 | Stern | 46/141 X |
| 3,273,261 | 9/1966 | Lovercheck | 35/17 |
| 3,605,326 | 9/1971 | Baginski | 46/44 |
| 3,721,039 | 3/1973 | Cook | 46/44 X |
| 3,863,386 | 2/1975 | Kinberg | 35/62 X |

*Primary Examiner*—Harland S. Skogquist

*Attorney, Agent, or Firm*—Gerald G. Crutsinger; John F. Booth; Harry C. Post, III

[57] ABSTRACT

Apparatus for teaching a technique known as the "abdominal thrust" or "upward thrust" for dislodging food from the throat of a choking victim. The device comprises a plastic manikin in the shape of a upper torso of a human being having an air bellows secured to the rear portion of the manikin within the hollow portion of the manikin and engaging a soft, flexible solar plexus plate located in a simulated position between where the lower rib would end and the lower portion of the stomach. The air bellows communicates with a tubular passage which is connected to the mouth of the victim. A bolus simulating a food particle is placed in the simulated throat and mouth piece and lodges against a shoulder which simulates the epiglottis in the esophagus. By engaging the solar plexus plate in the proper place and thrusting in the proper direction as taught by the technique, sufficient air is forced through the tubular passage to dislodge the bolus from the mouthpiece.

12 Claims, 3 Drawing Figures

U.S. Patent  Mar. 25, 1980  4,194,303
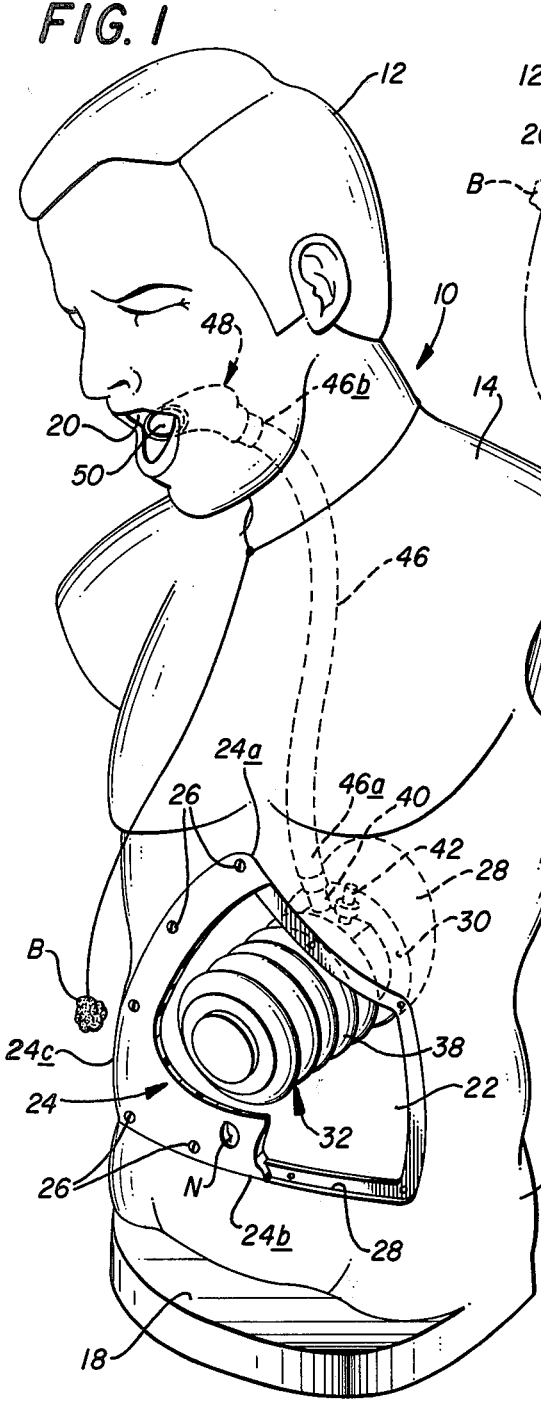
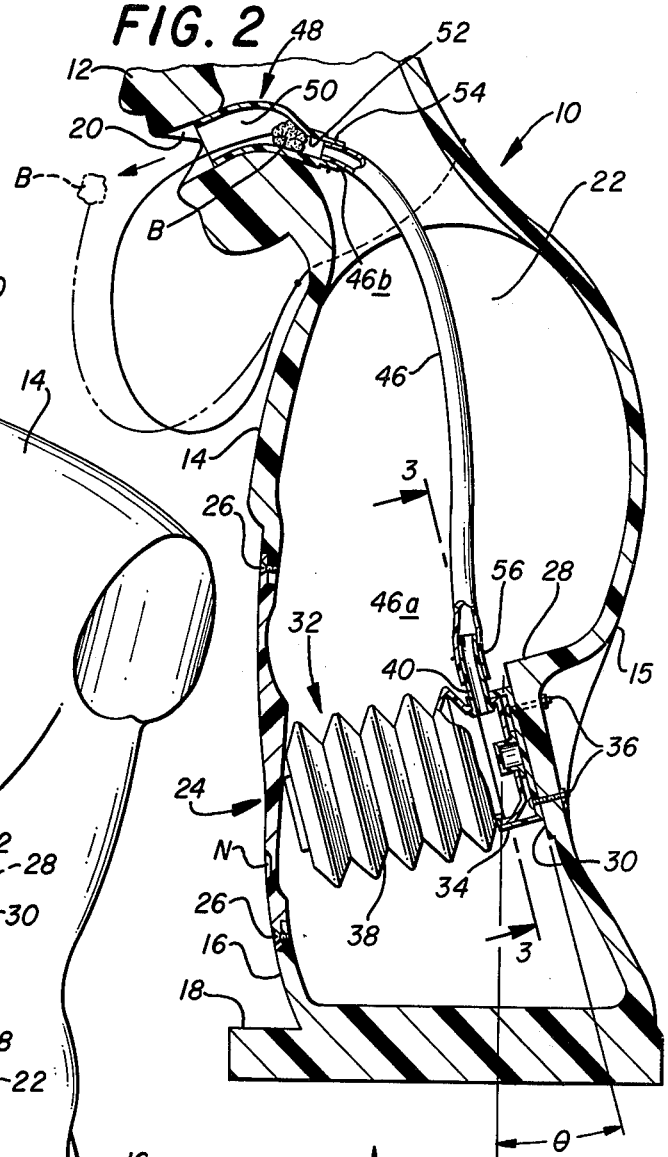
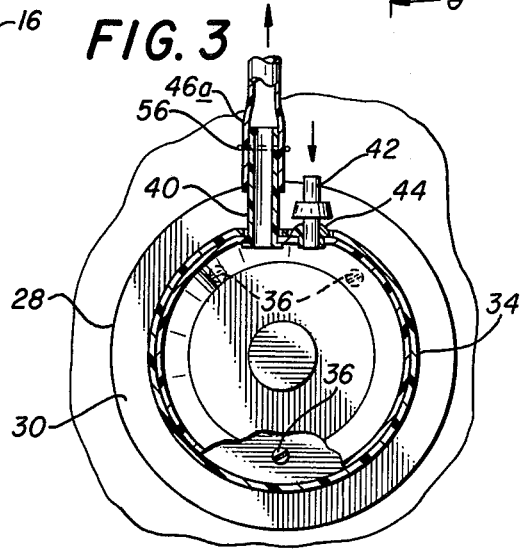

ANTI-CHOKING MANIKIN

BACKGROUND

Several people each year die from food stuck in their throat. Food strangulation can happen to anyone, healthy or old people, and often is the result of not carefully cutting the meat into small pieces or chewing it adequately.

If the windpipe is completely blocked, death can occur within four to five minutes. There are a large number of first aid measures which have been developed in attempting to rescue someone who is choking, such as forcing a cough, bending a person over and giving him a hard slap on the shoulder blades, attempting to remove lodged objects with the fingers, or even cutting a hole through the neck into the windpipe to perform a tracheotomy to create an emergency airway. Most of these methods are only partially successful and can create a hazard for the victim.

A new method of technique has been developed by a surgeon, Dr. Henry J. Heimlich of Cincinnati, which involves an abrupt upward squeeze of the choking victim's upper abdomen to expel the object blocking the windpipe. The techique utilizes the air within the lungs and a utilization of a soft spot in the solar plexus to quickly move the diaphragm to a position to expel the air in the lung at a rapid rate to expel the blocking object.

This method is quite popular and is generally known as the "upward thrust" or "abdominal thrust" technique.

This method is quite effective; however, it requires some instruction in order to perfect the method to properly expel the lodged food from the victim's throad without causing internal injury.

If the victim is standing the rescuer wraps his arms around the waist allowing the victim's head, arms and upper torso to hand forward. The rescuer makes a fist with one hand and grasps the fist with the other and places the thumb side of the fist against the victim's abdomen slightly above the navel and below the rib cage and gives a quick upward thrust with the fist into the victim's abdomen. This technique may be repeated.

If the rescuer is kneeling and the victim is lying flat on his back, the rescuer places one of the hands on top of the other and is placed with the heel of the bottom hand on the abdomen slightly above the navel and below the rib cage and gives a quick upward thrust into the victim's abdomen to dislodge the food.

In order to prevent internal injury due to too much pressure or improper placement of the hands and thrusting is necessary it is necessary that some instruction be given in this simple first-aid method.

Heretofore several manikins have been developed for teaching the technique of artificial respiration for a victim who had stopped breathing and for external heart massage for a victim of a heart disorder, however, there are no known devices for teaching the dislodging of food from a victim's throat.

SUMMARY

I have devised a manikin for teaching the "upward thrust" or "abdominal thrust" technique of dislodging food from the throat of a choking victim. The manikin comprises a hollow, plastic body cavity having a shape similar to that of the upper torso of human. The manikin has a air bellows pump secured within the hollow portion of the body at an angle downwardly from the back to the forward portion of the manikin to engage a soft, flexible solar plexus plate secured to the forward portion of the manikin. The outlet of the pump is connected to a piece of tubing forming a hollow passageway communicating with the mouth-throat member which communicates with a simulated mouth in the head of the manikin. A tubing and the mouth-throat member forms a shoulder with which to catch a bolus which comprises a piece of foreign matter such as foam rubber which is inserted into the throat of the manikin to block off the passageway.

The manikin may be placed in the upright position and a student stands behind the manikin and places the first fist with the thumb inward and places the second hand over the fist and makes a sharp upward thrust. This compresses a solar plexus plate to compress the air bellows forcing air through the air passageway to dislodge the bolus from the throat of the manikin.

A primary object of the invention is to provide a teaching manikin for teaching the upward thrust or abdominal thrust method of dislodging a blocking object from a choking victim's throat.

A further object of the invention is to provide a simulated teaching manikin which simulates the actual area which must be compressed and teaches the upward thrust method which must be used to use the air within the lungs of a choking victim to dislodge the blockage.

A still further object of the invention is to provide a device for teaching the simplified first aid method of dislodging a blocking object from the choking victim's throat and which maximizes teaching effectiveness of the inward and upward thrust which must be applied to the victim's abdomen.

Other and further objects of the invention will become apparent upon a detailed study of the description hereinafter following and to the drawings annexed hereto.

BRIEF DESCRIPTION OF THE DRAWINGS

Drawings of a preferred embodiment of the invention are annexed so that the invention may be better and more fully understood, in which:

FIG. 1 is a perspective view of the teaching manikin with parts broken away to more clearly illustrate the details of construction;

FIG. 2 is a cross-sectional view of the manikin with parts broken away to more clearly illustrate the details of construction; and FIG. 3 is a cross-sectional view taken along line 3—3 of FIG. 2.

Numeral references are used to designate like parts throughout the various figures of the drawings.

DESCRIPTION OF A PREFERRED EMBODIMENT

Referring to the drawings, numeral 10 generally refers to the manikin having a head 12, upper body 14, lower abdomen 16 and base 18.

The head 12 has a mouth 20 which communicates with a hollow cavity 22 in the manikin 10.

The manikin 10 is preferably constructed of a semi-rigid material such as plastic, polyvinyl chloride or vinyl. A soft, flexible solar plexus plate 24 or soft vinyl is secured in the abdominal area 16 of manikin 10 by means such as screws 26. The upper portion 24a of plate 24 is placed in a position which would indicate the lower portion of the sternum and the descending lowest rib of the rib cage. The lower edge 24b of plate 24 extends below the navel N and sides 24c extend outwardly across the frontal portion of the manikin 10. A recessed shoulder 28 is provided to hold the plate 24 in place and provide a smooth, flush surface on plate 24 to the abdominal area 16 of the manikin 10. The back 15 of manikin 10 has a molded air bellows receiving mount formed in the inner cavity 22 below a line with the upper portion of the solar plexus plate 24. The frontal surface 30 of air bellows receiving block 28 is formed at an angle $\theta$ of approximately 30 degrees from normal. The downward slope of the bellows 32 is important as will be more fully explained hereinafter.

Means to create air pressure such as air bellows 32 is secured between the air bellows receiving mount 28 and the inner wall of solar plexus plate 24. Bellows 32 is a typical air pump such as that manufactured by Karvex Manufacturing Corporation, Miami, FL. No. 986 high powered liquid and air pump.

The bellows 32 preferably is mounted at an angle such that an upward and inward thrust is required to compress the bellows 32 to simulate the thrust required to expel food from a human. If only an inward thrust is applied to plate 24 the bellows 32 will tend to slide downwardly and only be deflected and not deliver enough air.

The air bellows pump generally comprises a base 34 which is secured to surface 30 of air bellows receiving mount 28 by screws 36. The bellows 38 portion of air bellows 32 is flexibly secured within base 34 by an outlet nozzle 40 and inlet 42.

Outlet 40 communicates with the bellows 38 as best illustrated in FIG. 3. Inlet 42 comprises a one-way check valve allowing air to pass into the bellows 38 to expand same to normal position as illustrated in FIG. 2 and prevent air from being expelled out through the inlet when the bellows 38 is compressed. Outlet 40 communicates with a hollow tubular passageway 46 which simulates the esophagus. The first end of the tubular passageway 46a is secured to outlet 40 by a wire clamp 56. The second end 46b of passageway 46 communicates with mouth-throat member 48 and is secured there by wire clamp 54. The mouth-throat member 48 generally comprises a first end having a hollow passageway 50 which simulates the front portion of the mouth and throat and a reduced cross-sectional area 52 which is adapted to simulate the epiglottis to form a shoulder 52. A bolus B comprises a piece of foam is placed against the shoulder 52 to simulate a blockage in the passageway 46 which simulate food blocking the esophagus and air passageway to the lungs. The bolus B may be secured to a string or the like to prevent loss when teaching.

Operation of the hereinbefore described device is as follows:

The manikin 10 is set up to simulate the human body such that when the bolus B is placed in the throat piece 48 it simulates a choking victim. A student being taught the technique to expel the bolus B from the throat of the victim, if the victim is simulated in an upright position, stands behind the victim. The student forms a fist with one hand placing the thumb side of the hand on the flexible solar plexus plate 24 just above the navel N formed on the plate and below edge 24a which simulates the lower end of the rib cage. The student will then place his other hand over his fist and give a sharp, upward thrust compressing the solar plexus plate to the position 24' shown in dashed outline in FIG. 2, to compress the bellows 32 closing inlet 42 and forcing air out outlet 40 through passageway 46 which engages the bolus B at shoulder 52 to force same from the mouth-throat piece 48.

A second thrust may be necessary to dislodge the bolus B, as a second thrust may be necessary to dislodge food from a real victim.

The manikin 10 may be laid in a lower position to simulate a victim lying flat wherein the student would place the heel of one hand on the solar plexus plate 24 above the navel N and below edge 24a and a second hand over thus and thrust inwardly and upwardly to compress the bellows 32 to force air through the passageway 46 to dislodge the bolus B.

The manikin 10 may be covered with a shirt to increase the skill required to find the proper location on which to push.

It should be readily apparent that the apparatus hereinbefore described accomplishes the objects of the invention hereinbefore discussed.

It should further be apparent that other and further embodiments of the invention may be devised without departing from the basic concept herein.

Having described my invention, I claim:

1. A device for teaching a technique for dislodging foreign matter from the throat of a choking victim comprising: a simulated human torso having a hollow abdominal cavity, the front abdominal area of the torso being flexible such that the front abdominal area may be pushed inwardly, said torso having an opening formed in the area of the mouth; pump means, said pump means having an outlet and an inlet; a tubular passageway communicating between the outlet of said pump and the opening in said torso in the area of the mouth; means flexibly securing said pump means in said abdominal cavity at an angle relative to the front abdominal area such that when the flexible front abdominal area is pushed inwardly and upwardly said pump means is actuated to pump fluid through the outlet and through the passageway to disloge foreign matter from said passageway and when the front abdominal area is thrust inwardly only and substantially perpendicular to the front abdominal area, said pump means slides away from said thrust to prevent air from being exhausted from said passageway.

2. A device for teaching a technique for dislodging foreign matter from the throat of a choking victim comprising: a simulated human torso having a hollow abdominal cavity, the front abdominal area of the torso being flexible such that the front abdominal area may be pushed inwardly, said torso having an opening formed in the area of the mouth; a mount formed on a rear wall of the abdominal cavity, said mount having a surface formed at an angle relative to said front abdominal area; pump means flexibly secured to said mount such that said pump means is secured at an angle relative to the front abdominal area such that if the front abdominal area is thrust inwardly perpendicular to said front abdominal area, the pump means will slide downwardly to prevent adequate air from being exhausted from the pump means, said pump means having an outlet and an inlet; and a tubular passageway communicating between the outlet of said pump and the opening in said torso in the area of the mouth such that when the flexible front abdominal area is pushed inwardly and upwardly said pump means is actuated to pump fluid through the outlet and through the passageway to dislodge foreign matter from said passageway.

3. The teaching device of claim 2, with the addition of: a bolus adapted to be slideably disposed in said passageway.

4. The teaching device of claim 2, with the addition of: a mouth-throat member secured between the opening in the area of the mouth and the torso and tubular passageway, said mouth-throat member having a shoulder formed therein to catch foreign matter placed in the throat of the torso.

5. The teaching device according to claim 2, wherein said simulated human torso is constructed of semi-rigid material; and said front abdominal area is constructed of soft, flexible material.

6. The teaching device according to claim 2, wherein said front abdominal area comprises a flexible solar plexus plate secured over an opening formed in the front abdominal area of said plate simulating the location of the lower portion of the lowest rib of the rib cage and the abdominal area of a human; and means to secure said solar plexus plate to said simulated human torso.

7. The teaching device of claim 2, wherein said pump means comprises: a flexible bellows air pump.

8. The teaching device according to claim 7, wherein said bellows inlet comprises a one-way check valve to prevent air from being expelled as the bellows is compressed.

9. A device for teaching a technique of dislodging foreign matter from the throat of a choking victim comprising: a simulated human torso having a hollow abdominal cavity, the front abdominal area of the torso being flexible such that the front abdominal area may be pushed inwardly, said torso having an opening formed in the area of the mouth; flexible pump means; means securing said flexible pump means in said hollow abdominal cavity at an angle relative to the front abdominal area such that movement of the front abdominal area directly inwardly perpendicular to said abdominal area pushes said flexible pump means away from the thrust preventing adequate air from being exhausted from said flexible pump means; a tubular passageway communicating between the pump and the opening in the torso in the area of the mouth such that when the flexible front abdominal area is pushed inwardly and upwardly, said flexible pump means is actuated to pump fluid through the passageway to dislodge foreign matter from the upper end of said passageway.

10. The teaching device according to claim 9, wherein said flexible pump means has an inlet and an outlet; and a check valve to position the said inlet to prevent air from being expelled from said flexible pump means through the inlet as the pump means is compressed.

11. The teaching device according to claim 9, including a simulated navel formed on the front abdominal area of the simulated human torso being adapted to guide in positioning of the hands of the user about the simulated human torso into a double fist position just above the navel such that a sharp inwardly and upwardly thrust will compress said flexible pump means to expel air from the passageway of the torso.

12. The teaching device according to claim 9, including: a reduced cross-sectional area of the passageway near the opening in the torso in the area of the mouth; and a resilient piece of foreign matter adapted to be positioned in the passageway and come into contact with the reduced cross-sectional area of the passageway such that it is not easily expelled from the passageway.

* * * * *